United States Patent [19]

King et al.

[11] Patent Number: 5,528,745
[45] Date of Patent: Jun. 18, 1996

[54] METHOD AND SYSTEM FOR THE DISPLAY OF SCHEDULING INFORMATION FOR USERS WITHIN A SINGLE VIEWPORT

[76] Inventors: C. David King, 2206 Welsh Cir.; Robert J. Torres, 6100 Meadowhill Dr., both of Colleyville, Tex. 76034

[21] Appl. No.: 330,483

[22] Filed: Oct. 28, 1994

[51] Int. Cl.⁶ ....................................................... G06F 3/00
[52] U.S. Cl. .......................... 395/161; 364/401; 395/157; 395/159
[58] Field of Search ..................... 395/155–161; 345/117–120, 146, 902; 364/705.08, 401–402

[56] References Cited

U.S. PATENT DOCUMENTS

| | | | |
|---|---|---|---|
| 4,688,167 | 8/1987 | Agarwal | 395/157 |
| 4,807,154 | 2/1989 | Scully et al. | 395/161 |
| 4,807,155 | 2/1989 | Cree et al. | 395/161 |
| 4,817,018 | 3/1989 | Cree et al. | 395/161 |
| 4,819,191 | 4/1989 | Scully et al. | 395/161 |
| 4,831,552 | 5/1989 | Scully et al. | 395/161 |
| 5,129,057 | 6/1992 | Strope et al. | 395/161 |
| 5,165,012 | 11/1992 | Crandall et al. | 395/161 X |
| 5,261,045 | 11/1993 | Scully et al. | 395/161 |
| 5,323,314 | 6/1994 | Baber et al. | 364/401 |
| 5,337,405 | 8/1994 | Lindauer et al. | 395/155 X |
| 5,365,360 | 11/1994 | Torres | 395/159 |
| 5,420,978 | 5/1995 | Tozawa et al. | 395/161 |
| 5,428,736 | 6/1995 | Kahl et al. | 395/159 |
| 5,428,784 | 6/1995 | Cahill, Jr. | 364/401 X |

*Primary Examiner*—Mark R. Powell
*Assistant Examiner*—John E. Breene

[57] ABSTRACT

A method and system in a data processing system for providing an intuitive display of scheduling information for multiple users within a single viewport. Each user is associated with scheduled events which may be displayed along a time line within a viewport on a display within the data processing system. Selection regions are determined within the viewport. Selection regions may be associated with scheduled events, users, or user specified time periods along the time line. Scheduling information is associated with each selection region. While a user is continuously selecting one of the selection regions, the scheduling information associated with the selection region being selected by the user is temporarily displayed. Once the user ceases selecting the selection region, the scheduling information disappears.

18 Claims, 10 Drawing Sheets

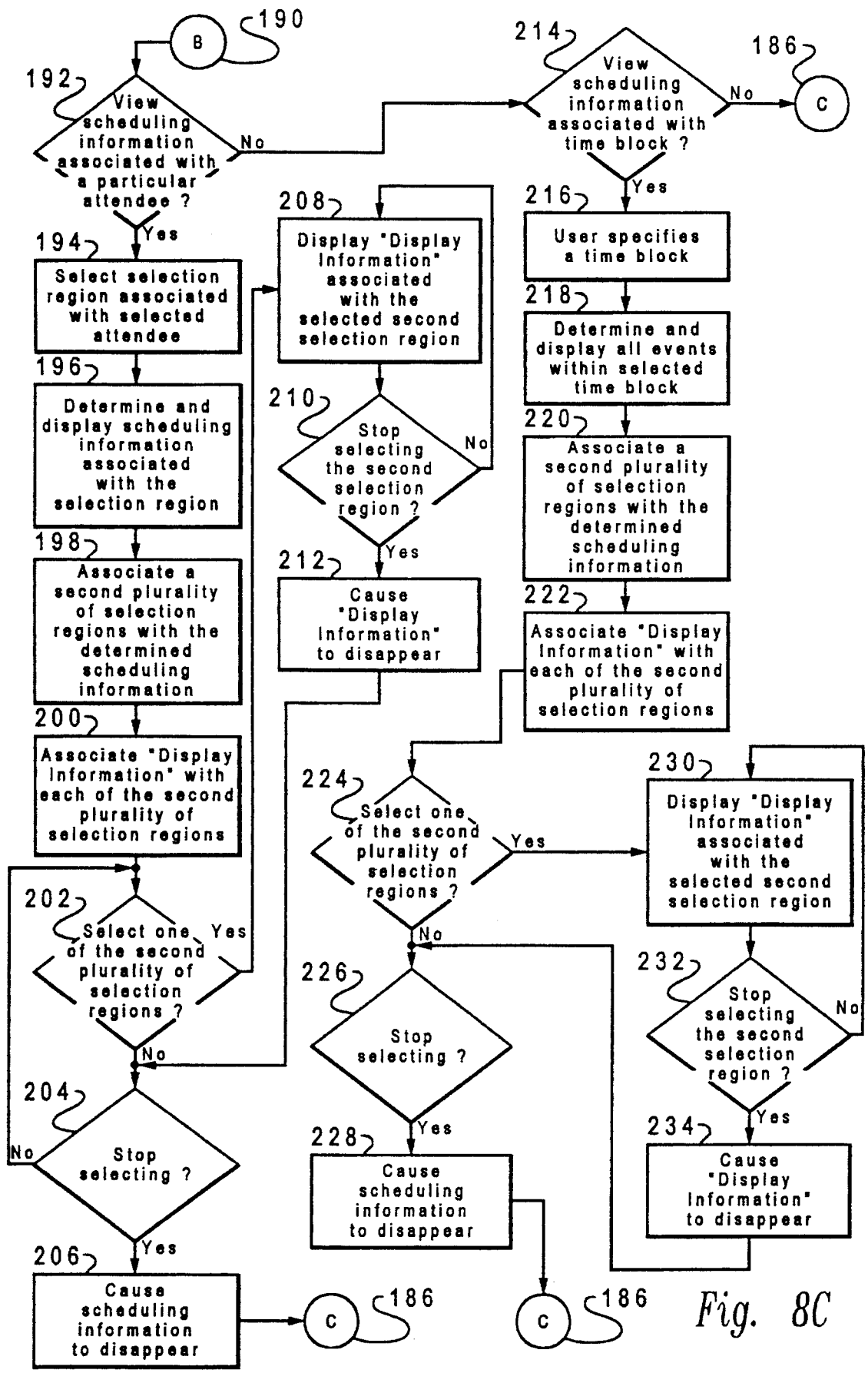

METHOD AND SYSTEM FOR THE DISPLAY OF SCHEDULING INFORMATION FOR USERS WITHIN A SINGLE VIEWPORT

BACKGROUND OF THE INVENTION

1. Technical Field

The present invention relates to data processing system based meeting scheduling systems, and in particular to a method and system for providing an intuitive display of scheduling information for a plurality of users within a single viewport. Still more particularly, the present invention relates to the determination of selection regions within a single viewport, the temporary display of scheduling information associated with a selection region selected by a user while the user is continuously selecting the selection region.

2. Description of the Related Art

It is known in the art to permit users of data processing system calendaring systems to schedule meetings for specified attendees during specified time periods. Users of these systems may specify equipment and resources, along with desired attendees for the meeting. One example of such a system is U.S. Pat. No. 5,323,314 issued to Baber et al.

In this system, an available time for a meeting may be determined once a user has specified attendees and resources for the meeting. In addition, the status of the attendees and resources may be graphically displayed to the user in a viewport utilizing graphically distinct objects associated with each attendee or resource. These objects are adjacently displayed along a time line. The display is not intuitive. It is time consuming for a user to correlate the graphically distinct object with its associated attendee or resource.

In accordance with Baber, a user may view a list of attendees or resources at a particular time within the time line by selecting the particular time. In response to this selection, a second viewport is permanently displayed including a list of each attendee or resource which is scheduled at that time, along with the beginning and ending time for the scheduled event, and whether the attendees' or resources' presence is mandatory. The user must "close" this viewport when the information is no longer needed.

This system and other known systems display conflict schedule information. In order to view the details for an entire day or group of days, such as event name, duration, and meeting time, for a particular attendee, the user would need to access the attendee's individual calendar. This manner of viewing details for attendees or resources can be very time consuming and tedious if more than a few attendees are included.

Therefore, it should be apparent that a need exists for a method and system which provides for an intuitive display of scheduling information for a plurality of users within a single viewport.

SUMMARY OF THE INVENTION

It is therefore one object of the present invention to provide an improved data processing system based on meeting scheduling systems.

It is another object of the present invention to provide an intuitive display of scheduling information for a plurality of users within a single viewport in a data processing system.

It is yet another object of the present invention to provide an improved data processing system for determining selection regions within a single viewport, and the temporary display of scheduling information associated with a selection region selected by a user while the user is continuously selecting the selection region.

The foregoing objects are achieved as is now described. A method and system in a data processing system are disclosed for providing an intuitive display of scheduling information for multiple users within a single viewport. Each user is associated with scheduled events which may be displayed along a time line within a viewport on a display within the data processing system. Selection regions are determined within the viewport. Selection regions may be associated with scheduled events, users, or user specified time periods along the time line. Scheduling information is associated with each selection region. While a user is continuously selecting one of the selection regions, the scheduling information associated with the selection region being selected by the user is temporarily displayed. Once the user ceases selecting the selection region, the scheduling information disappears.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 8A–8C together depict a high level flow chart which illustrates the display of scheduling information associated with selection regions in accordance with the method and system of the present invention.

DETAILED DESCRIPTION OF PREFERRED EMBODIMENT

Figure 1:
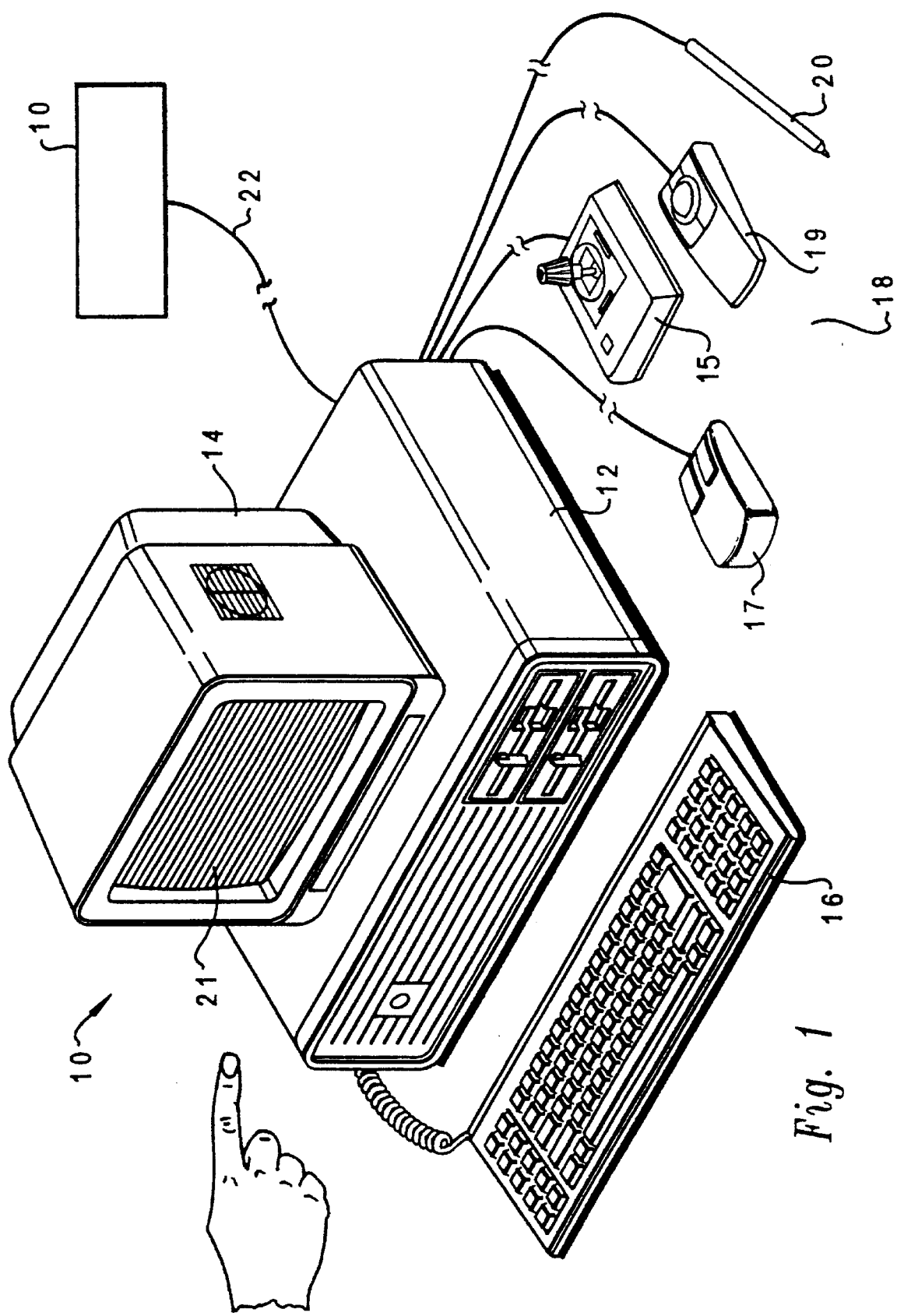
FIG. 1 is a pictorial representation of a data processing system which may be utilized to implement the method and system of the present invention.

With reference now to the figures and in particular with reference to FIG. 1, there is depicted a pictorial representation of a data processing system 10 which may be utilized to implement the method and system of the present invention. Data processing system 10 includes a computer 12, computer display 14, keyboard 16, and multiple input pointing devices 18. Those skilled in the art will appreciate that input pointing devices 18 may be implemented utilizing a pointing stick 15, a mouse 17, a track ball 19, a pen 20, or other devices that permit a user to manipulate objects in a graphical manner on computer display 14. Those skilled in the art will appreciate that any number of data processing systems 10 may be communicate with each other via a computer network 22.

Figure 2:
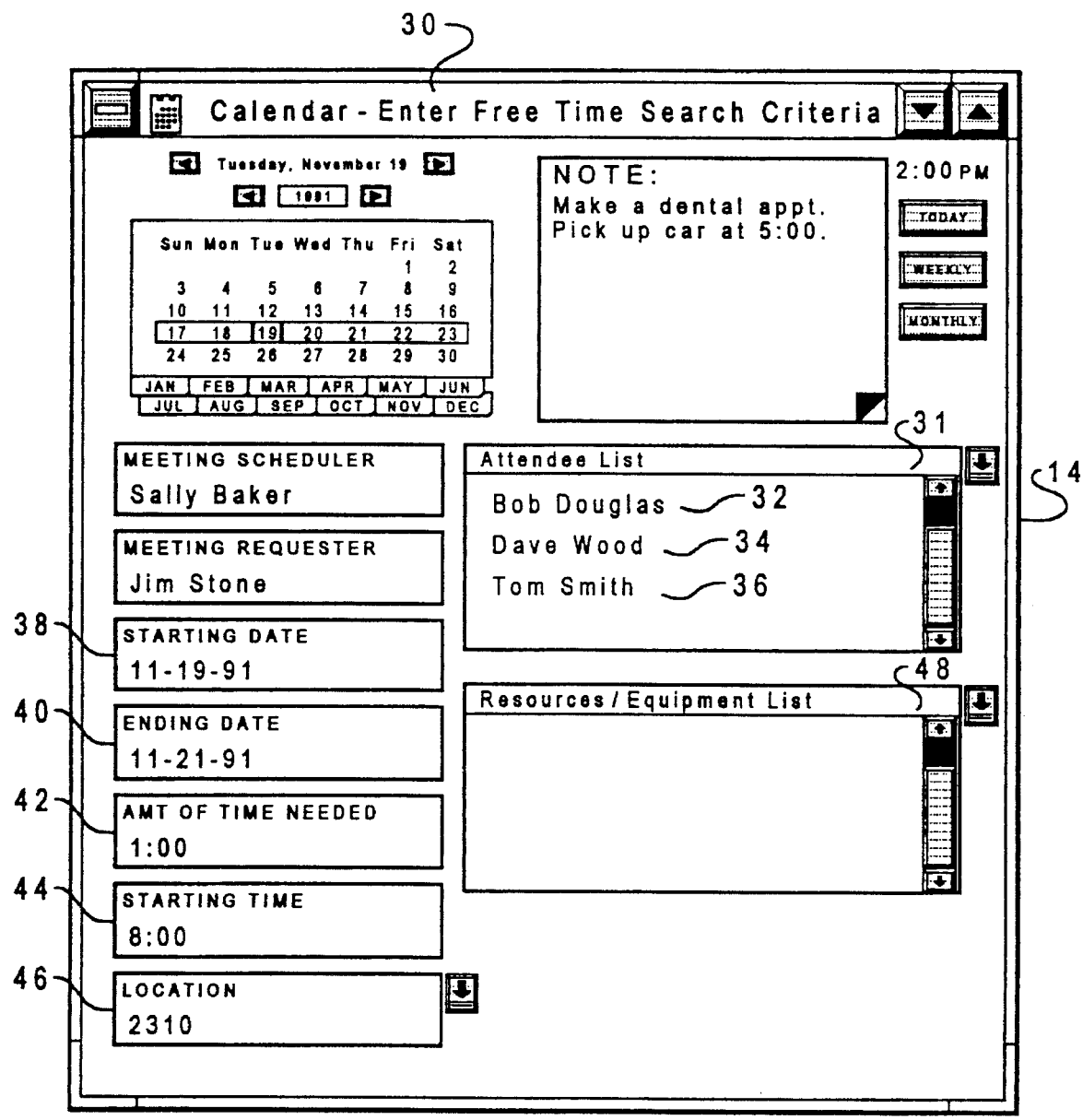
FIG. 2 is a pictorial representation of a viewport which may be utilized for specifying parameters for a meeting to be scheduled in accordance with the method and system of the present invention.

Referring now to FIG. 2, there is depicted a pictorial representation of a viewport 30, displayed within computer display 14, which may be utilized for specifying parameters for a meeting to be scheduled in accordance with the method and system of the present invention. Viewport 30 may be utilized by a user in order to specify parameters to be utilized to schedule a meeting for selected attendees 32, 34, and 36. The selected attendees 32, 34, and 36 may be entered into attendee list 31. The parameters may include a meeting starting date, ending date, duration or amount of time needed for the meeting, starting time, and location for the meeting. A user may specify a first period of time within which the meeting is to be held. The user may specify a start date 38 for the first period of time such as Nov. 11, 1991, an ending date 40 such as Nov. 21, 1991, the amount of time 42 needed for the meeting such as one hour, a starting time 46 for the first period of time such as 8:00, and a location 46 such as location 2310 . In addition, any necessary resources may be specified in resources/equipment list 48.

Once the parameters for the meeting have been specified, computer 12 determines all periods of time within the specified first period of time defined by the start date 38 and the ending date 40, which meet the user's specified parameters. A second period of time is then determined which is the earliest period of time which occurs within the first period of time within which all parameters are satisfied.

Figure 3:
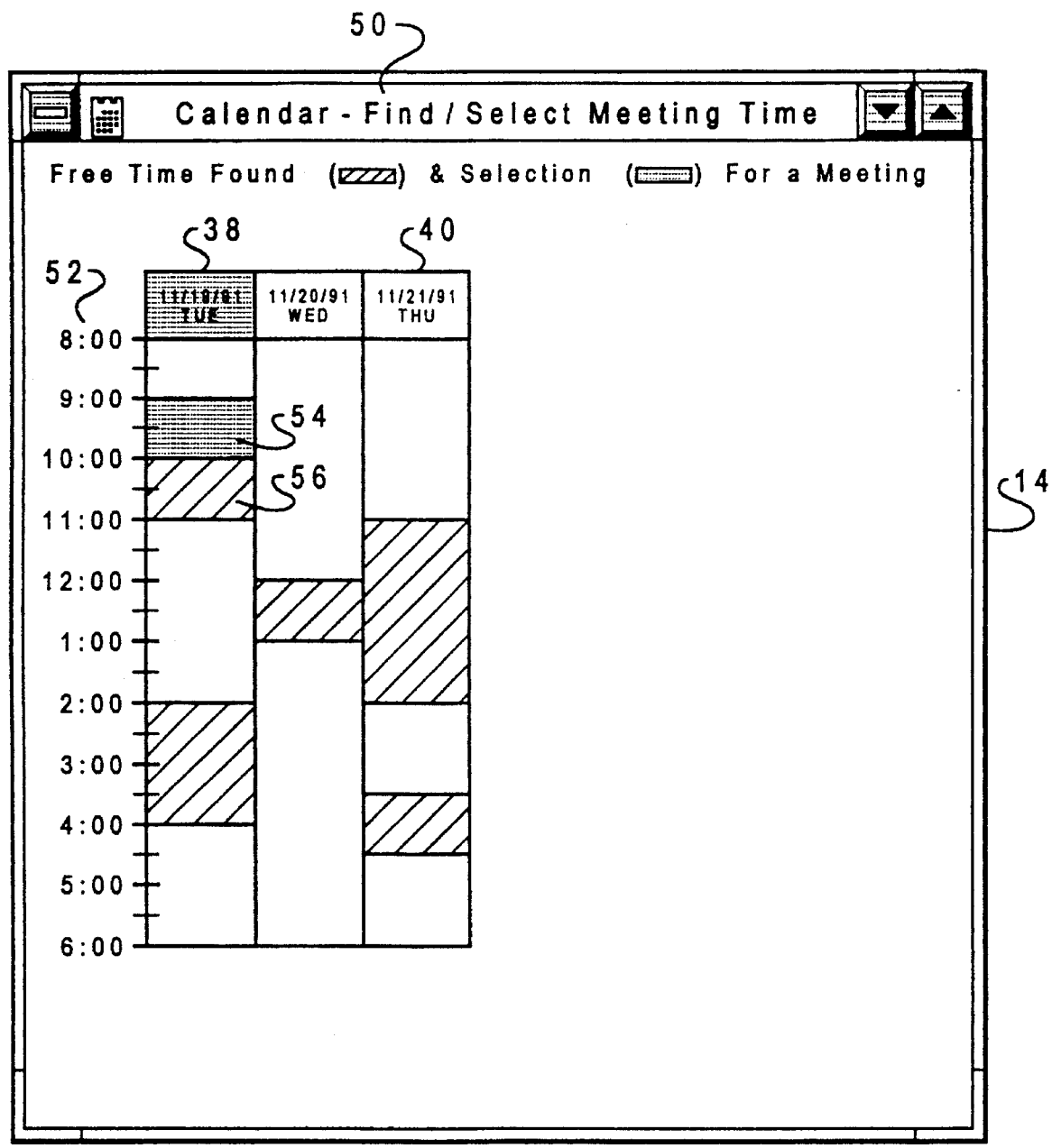
FIG. 3 is a pictorial representation of a viewport which depicts all time periods which satisfy the specified parameters, and which may be utilized to select one period of time within which to hold the meeting in accordance with the present invention.

Referring now to FIG. 3, there is depicted a pictorial representation of a viewport 50 displayed within computer display 14 which depicts all time periods which satisfy the specified parameters, and which may be utilized to select one period of time within which to hold the meeting. All periods of time within the specified first period of time which meet all specified parameters are displayed within viewport 50. All days included from start date 38 to ending date 40 are displayed in FIG. 3. All periods of time which meet the user's specified parameters are displayed along time line 52. A one hour duration for the meeting was specified. Therefore, all periods of time of at least one hour which satisfy the other parameters are displayed within viewport 50.

Second period of time 54 is the earliest period of time which satisfies the specified parameters. All specified attendees 32, 34, and 36 and any specified resources are available to meet at location 2310 during second period of time 54. Period of time 56 is another period of time within which all specified parameters are satisfied. The earliest period of time within which the specified parameters are satisfied is automatically selected for the meeting. However, a user may select one of the other periods of time for the meeting by utilizing an input pointing device 18.

Figure 4:
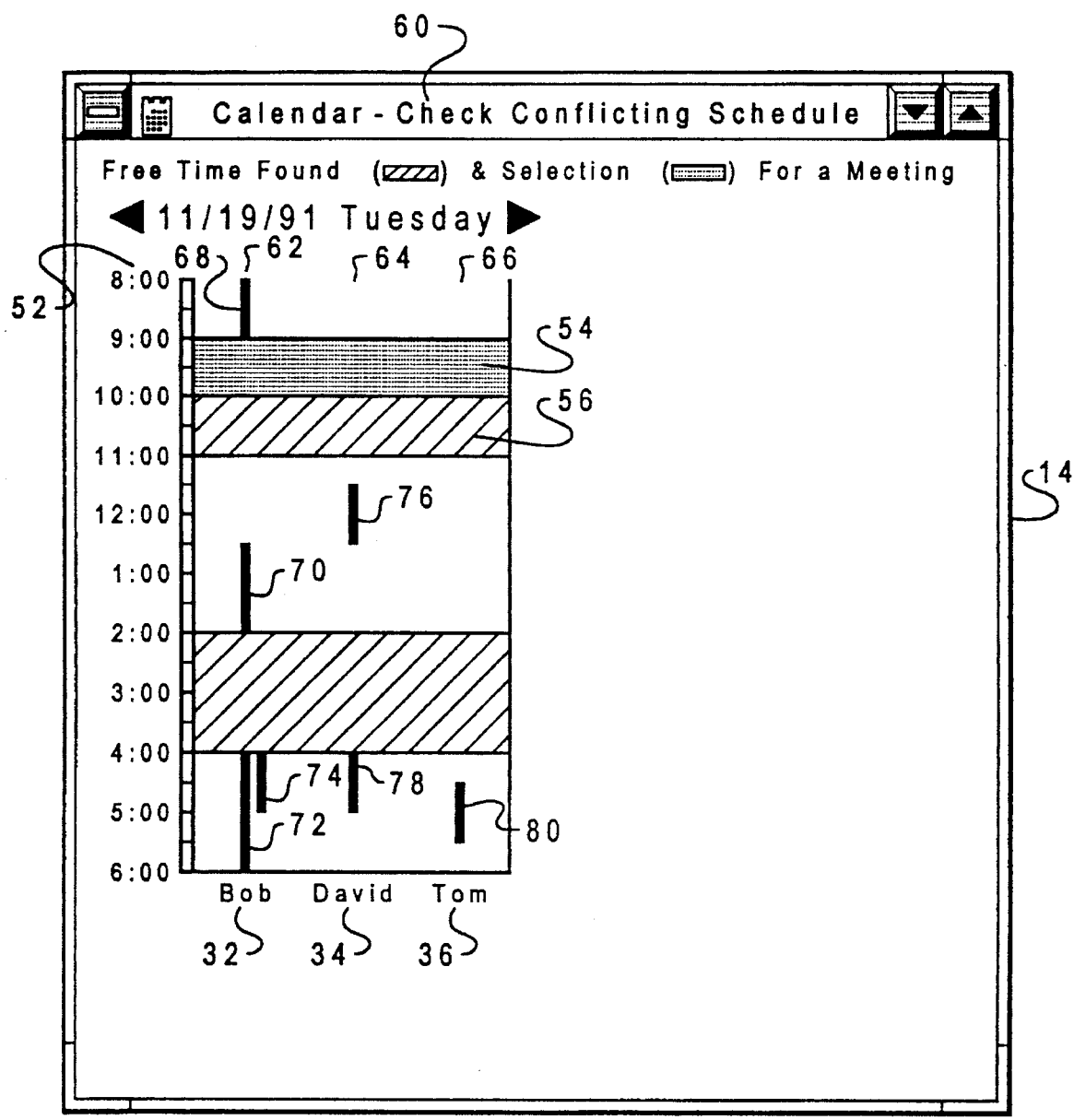
FIG. 4 is a pictorial representation of a viewport which depicts scheduled events associated with specified attendees within a day which includes a second period of time within which to hold the meeting in accordance with the method and system of the present invention.

Referring now to FIG. 4, there is depicted a pictorial representation of a viewport 60 displayed within computer display 14 which depicts scheduled events associated with specified attendees within a day which includes second period of time 54. Viewport 60 is an intuitive display of scheduled events associated with each selected attendee 32, 34, and 36 during the day which includes second period of time. Each attendee is associated with a contiguous linear area along time line 52 within which scheduled events for the attendee are displayed. For example, attendee 32 is associated with area 62. All scheduled events for attendee 32 during the displayed date are displayed within area 62. Similarly, all events for attendee 34 are displayed within area 64, and all events for attendee 36 are displayed within area 66. Scheduled events 68, 70, 72, and 74 are scheduled for attendee 32. Scheduled events 76 and 78 are scheduled for attendee 34, and scheduled event 80 is scheduled for attendee 36.

Since second period of time 54 was selected as the period of time within which to have the meeting, the scheduled events for Nov. 19, 1991 are displayed. In addition, all other periods of time, such as period of time 56, within viewport 60 are displayed. It should be apparent to those skilled in the art that viewport 60 provides an intuitive display of scheduled events which may be easily and quickly understood by the user.

Figure 5:
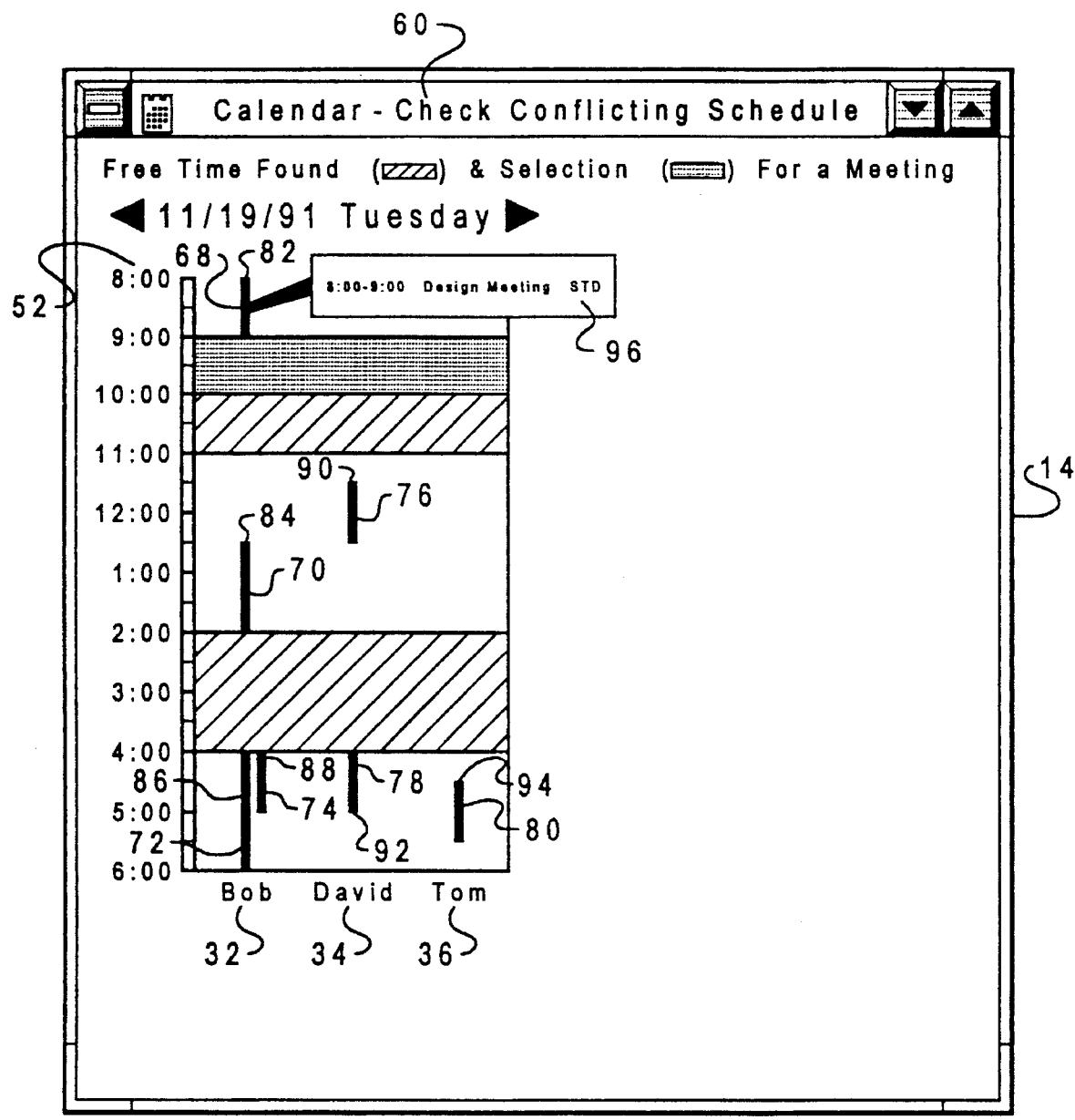
FIG. 5 is a pictorial representation of a viewport which depicts a selection region associated with a scheduled event for a particular attendee, and the temporary display of scheduling information associated with the selection region in accordance with the method and system of the present invention.

Referring now to FIG. 5, there is depicted a pictorial representation of a viewport 60 displayed within computer display 14 which further depicts a selection region 82 associated with a scheduled event for a particular attendee, and the temporary display of scheduling information associated with selection region 82 in accordance with the method and system of the present invention. A plurality of selection regions may be determined within viewport 60. A selection region is associated with each scheduled event displayed within viewport 60. For example, selection regions 82, 84, 86, 88, 90, 92, and 94 may be associated with scheduled events 68, 70, 72, 74, 76, 78, and 80, respectively.

A user may select a selection region utilizing a pointing device 18. While a user is continuously selecting a selection region, scheduling information associated with the selected selection region is displayed. For example, a user may select selection region 82 utilizing an input device such as mouse 17, by depressing one of the mouse buttons of mouse 17. While a user continues to depress the mouse button, scheduling information 96 will be displayed. When a user has selected a selection region associated with a scheduled event, the displayed scheduling information may include additional details regarding the scheduled event. Scheduling information 96 includes the time of the event such as 8:00–9:00, the title of the event such as "Design Meeting", and the fact that attendee 32 is a standard attendee for the event. A user may specify that an attendee's presence be standard or mandatory.

Once a user has stopped depressing the mouse button, scheduling information 96 will disappear. Therefore, in accordance with the present invention, a user may select selection regions in order to determine additional details regarding the schedule event associated with the selection region selected by the user.

Figure 6:
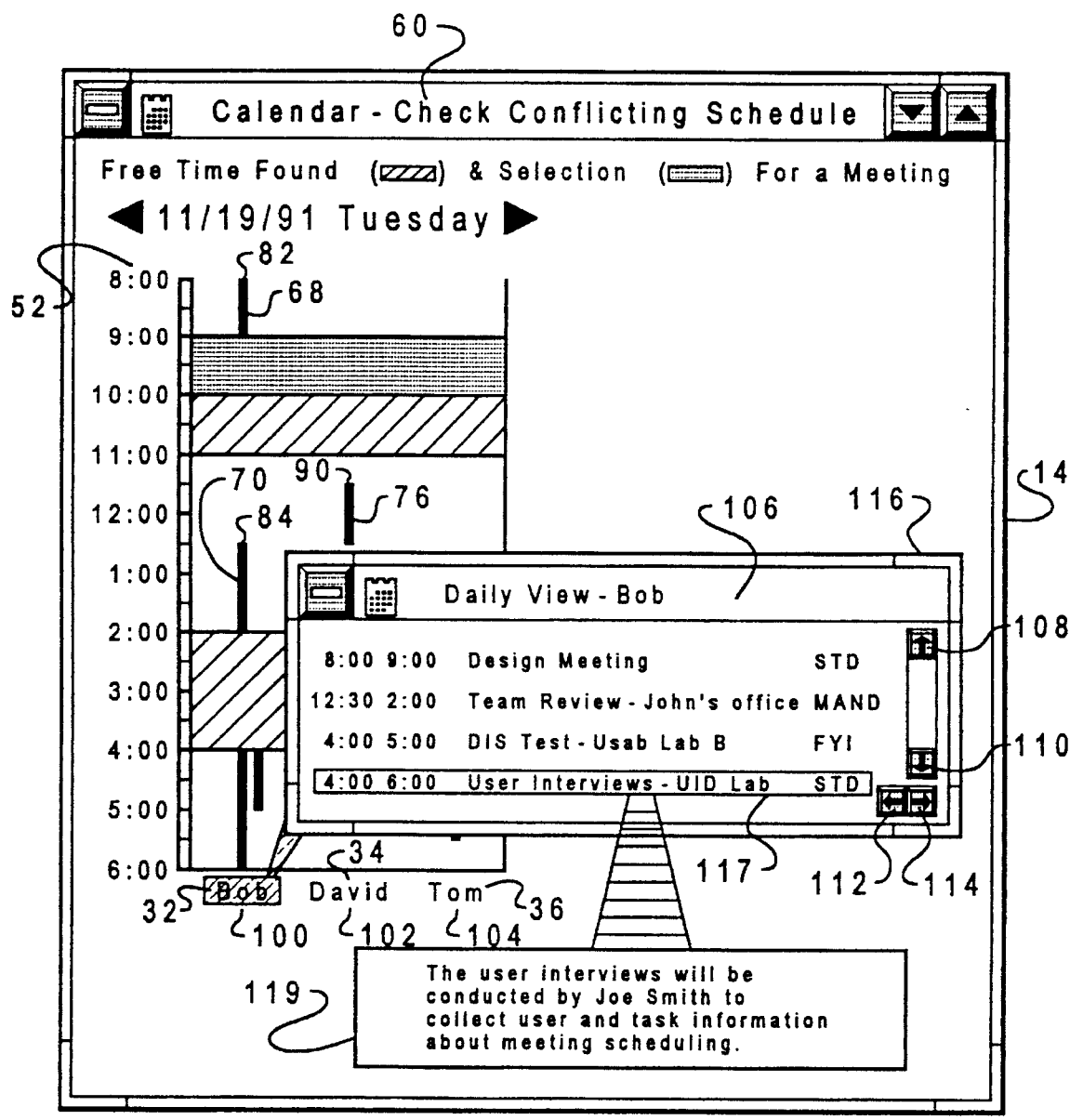
FIG. 6 is a pictorial representation of a viewport which depicts a selection region associated with a particular attendee, and the temporary display of scheduling information associated with the selection region in accordance with the method and system of the present invention.

Referring now to FIG. 6, there is depicted a pictorial representation of a viewport 60 displayed within computer display 14 which further depicts a selection region 100 associated with a scheduled event for a particular attendee, and the temporary display of scheduling information associated with selection region 100 in accordance with the method and system of the present invention. A selection region may also be associated with each attendee. For example, selection regions 100, 102, and 104 may be associated with attendees 32, 34, and 36, respectively.

Only while a user is continuously selecting selection region 100, will scheduling information 106 be displayed. Scheduling information 106 includes all of the scheduled events for attendee 32 during the particular day, such as Nov. 19, 1991. Therefore, by continuing to select selection region 100, a user may view only those scheduled events for the selected attendee.

While scheduling information 106 is being displayed, a user may select one of a second plurality of selection regions which are associated with scheduling information 106. Each of the second plurality of selection regions is associated with "display information". While a user is continuing to select one of the second plurality of selection regions, the "display information" associated with the selected second selection region is displayed. When a user has stopped the process of selecting the second selection region, the associated display information will disappear. For example, a user may select second selection region 117 only while scheduling information 106 is being displayed. In response to this selection, display information 119 will be temporarily displayed. When the user has stopped selecting selection region 117, display information 119 will disappear.

While scheduling information 106 is being displayed, a user may also utilize scroll buttons 108, 110, 112, and 114 to modify the display of scheduling information 106. For example, if only part of scheduling information 106 is visual at one time, a user may use scroll buttons 108, 110, 112, or 114 to view any additional scheduling information which is not currently displayed within viewport 116. Those skilled in the art will appreciate that a variety of means may be utilized to modify the display of scheduling information 106. Scroll bars and cursors may be utilized to do so, instead of scroll buttons. In addition, selection regions may be specified within viewport 116 in a manner similar to that described above.

Figure 7:
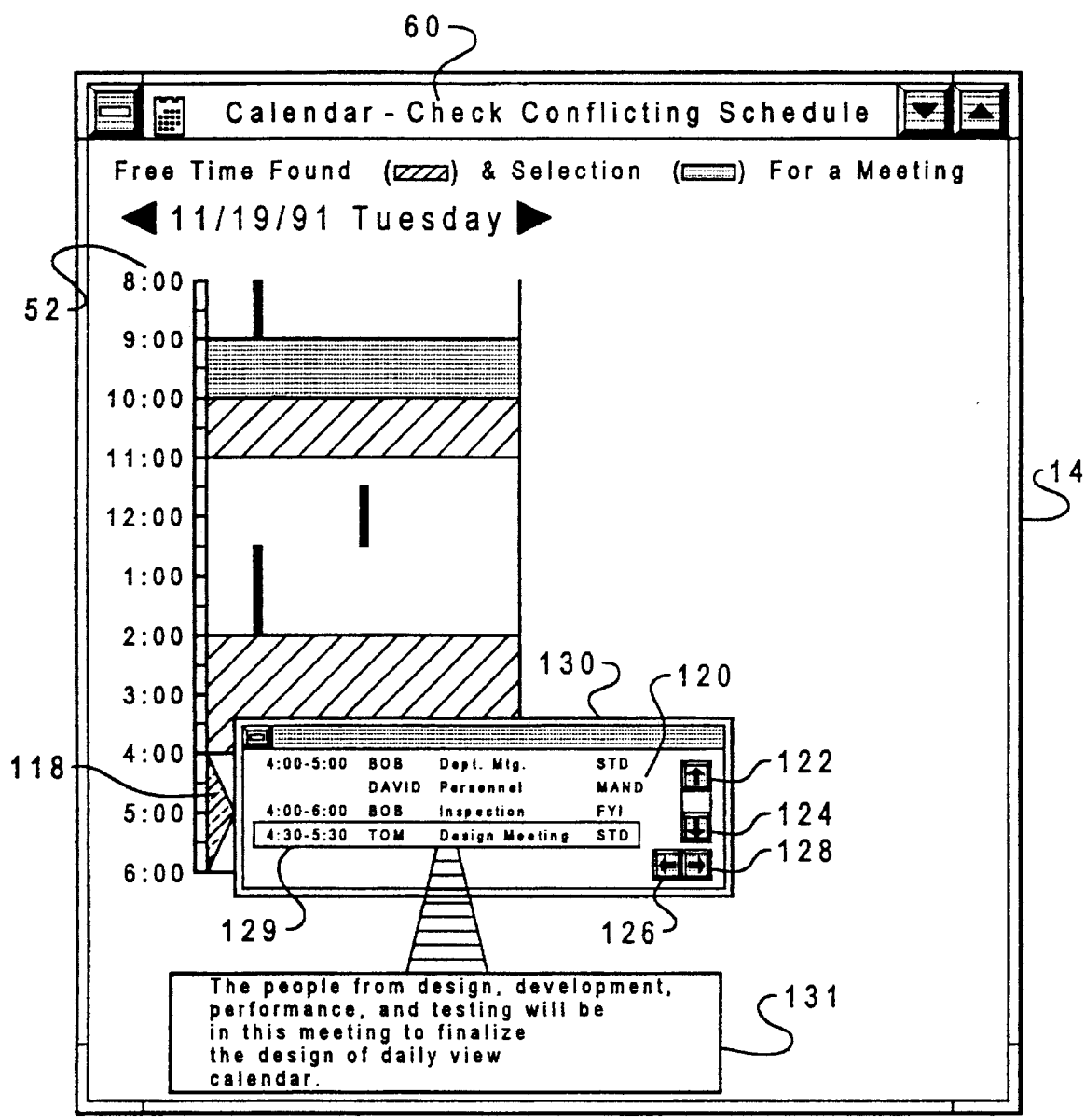
FIG. 7 is a pictorial representation of a viewport which depicts a selection region associated with a user specified time block, and the temporary display of scheduling information associated with the selection region in accordance with the method and system of the present invention.

Referring now to FIG. 7, there is depicted a pictorial representation of a viewport 60 displayed within computer display 14 which further depicts a selection region 118 associated with a user specified time block, and the temporary display of scheduling information associated with selection region 118 in accordance with the method and system of the present invention. A user may specify a selection region which includes a time block along time line 52 by selecting a starting time for the time block and an ending time for the time block. For example, selection region 118 may be associated with a time block from 4:00 p.m. to 6:00 p.m.

Only while a user is selecting selection region 118, will scheduling information 120 be displayed. Scheduling information 120 includes all of the scheduled events for all attendees which occur during the specified time block, 4:00 to 6:00. Therefore, by continuing to select selection region 120, a user may view only those scheduled events which occur during the specified time block.

While scheduling information 120 is being displayed, a user may select one of a second plurality of selection regions which are associated with scheduling information 120. Each of the second plurality of selection regions is associated with "display information". While a user is continuing to select one of the second plurality of selection regions, the "display information" associated with the selected second selection region is displayed. When a user has stopped the process of selecting the second selection region, the associated display information will disappear. For example, a user may select second selection region 129 only while scheduling information 120 is being displayed. In response to this selection, display information 131 will be temporarily displayed. When the user has stopped selecting selection region 129, display information 131 will disappear.

While scheduling information 120 is being displayed, a user may also utilize scroll buttons 122, 124, 126, and 128 to view any additional scheduling information which is not displayed within viewport 130. For example, if only part of scheduling information 120 is visual at one time, a user may use scroll buttons 122, 124, 126, or 128 to view any additional scheduling information which is not currently displayed within viewport 130. Those skilled in the art will appreciate that a variety of means may be utilized to modify the display of scheduling information 120. Scroll bars and cursors may be utilized to do so, instead of scroll buttons. In addition, selection regions may be specified within viewport 130 in a manner similar to that described above.

In the manner described, a user may access scheduling information from a single viewport in an intuitive manner. In addition, a user may specify and have displayed only the scheduling information which may be useful, without cluttering the viewport with unwanted scheduling information.

Figure 8A:
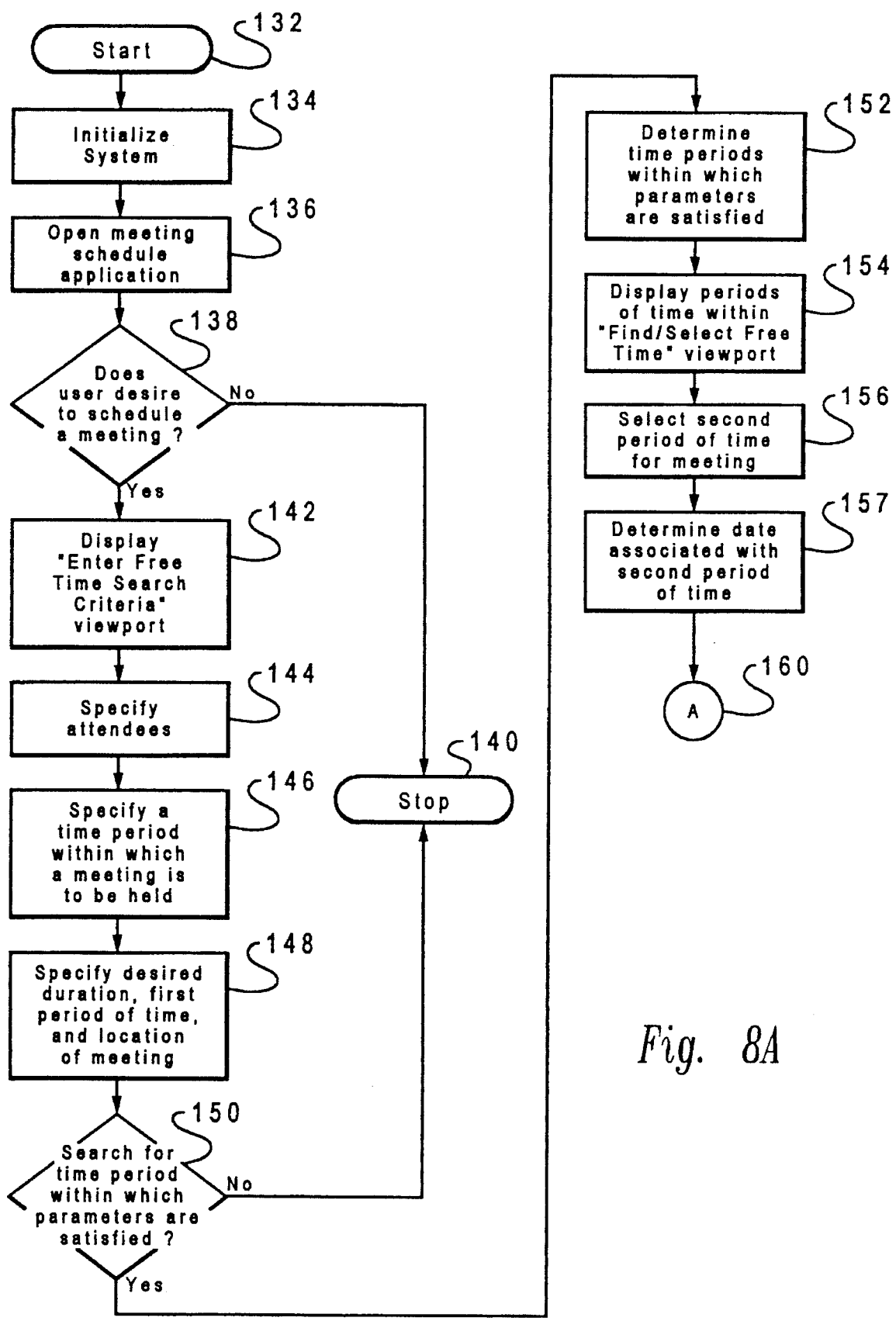
Figure 8B:
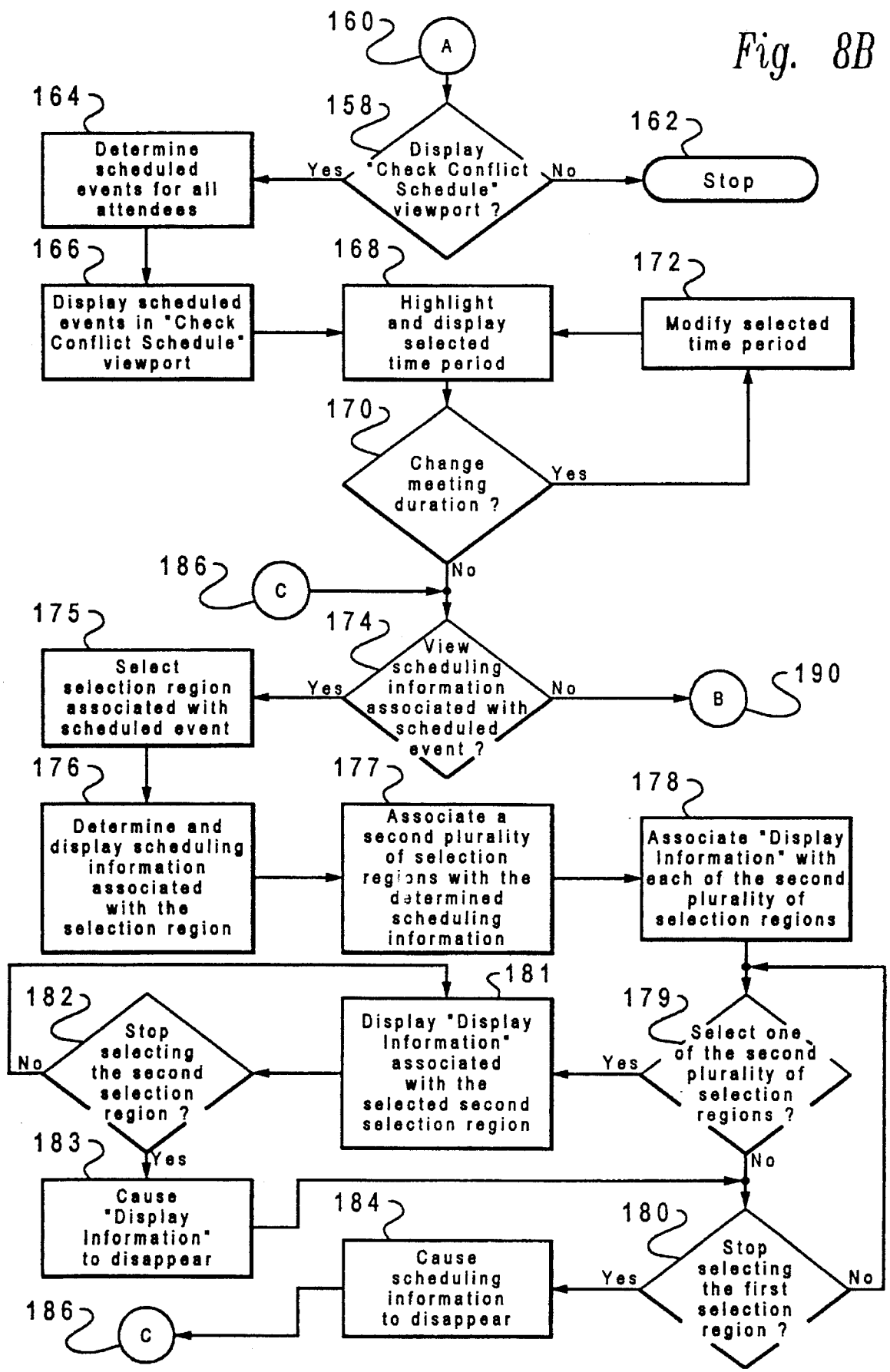

Referring now to FIGS. 8A–8C, there is depicted a high level flow chart which illustrates the display of scheduling information associated with selection regions in accordance with the method and system of the present invention. The process begins as depicted at block 132 and thereafter passes to block 134 which depicts the initialization of data processing system 10. Thereafter, the process passes to block 136 which illustrates the opening of a meeting scheduling application. Block 138 then depicts a determination of whether or not a user desires to schedule a meeting. If a determination is made that the user does not desire to schedule a meeting, the process terminates as depicted at block 140.

Referring again to block 138, if a determination is made that a user does desire to schedule a meeting, the process passes to block 142 which illustrates the displaying of an "Enter Free Time Search Criteria" viewport. Thereafter, block 144 depicts the specification of attendees. Next, block 146 illustrates the specification of a desired duration, starting and ending time for a first period of time within which to have the meeting, and location for the meeting.

Next, block 150 illustrates a determination of whether or not a user desires to search for a second time period within which the specified parameters are satisfied. If a determination is made that the user does not desire to have the search performed, the process again terminates as depicted at block 140. Referring again to block 150, if a determination is made that a user does desire to have the search performed, the process passes to block 152 which illustrates a determination of all time periods within which the parameters are satisfied. Next, block 154 depicts the displaying of all of these time periods within a "Find/Select Free Time" viewport. Next, block 156 illustrates the selection of a second period of time within which to hold the meeting. Then, block 157 depicts a determination of the date associated with the second period of time. The process then passes to block 158 as illustrated through block 160.

Block 158 illustrates a determination of whether or not a user desires to display a "Check Conflict Schedule" viewport. If a determination is made that the user does not desire to display the viewport, the process terminates as depicted at block 162. Referring again to block 158, if a determination is made that the user does desire to display the viewport, the process passes to block 164 which illustrates a determination of all of the scheduled events for each attendee for the date associated with the second period of time. Next, block 166 depicts the displaying of scheduled events for each attendee within a contiguous linear area associated with each attendee along a time line displayed within the "Check Conflict Schedule" viewport.

The process then passes to block 168 which illustrates the highlighting and display of the second period of time within which to hold the meeting. Next, block 170 depicts a determination of whether or not the user desires to change the meeting duration. If a determination is made that the user does desire to change the duration of the meeting, the process passes to block 172 which depicts the modification of the second period of time. For example, a user may lengthen the duration of the second period of time if there exists an adjacent time period within which the parameters are also satisfied. For example, a user may modify selected time period 54 by adding time period 56 to permit a meeting having a two hour duration, see FIG. 4.

Referring again to block 170, if a determination is made that the user does not desire to change the meeting duration, the process then passes to block 174 which illustrates a determination of whether or not a user desires to view scheduling information associated with a scheduled event. If a determination is made that the user does desire to view scheduling information associated with a scheduled event, the process passes to block 175 which depicts the selection of a selection region associated with a scheduled event. Next, block 176 depicts the determination and displaying of the scheduling information associated with the selection region.

The process then passes to block 177 which illustrates the association of a second plurality of selection regions with the determined scheduling information. The process passes to block 178 which illustrates the association of "display information" with each of the second plurality of selection regions. Next, block 179 depicts a determination of whether or not one of the second plurality of selection regions has been selected. A second selection region may be a scroll button or bar. A user might select one of the second selection regions by depressing a mouse button once the mouse pointer is located over the selection region. If a determination is made that one of the second plurality of selection regions has not been selected, the process passes to block 180.

Block 180 depicts a determination of whether or not the user stopped the process of selecting the first selection region, associated with the scheduling information. If a determination is made that the user has not stopped the process of selecting the selection region associated with the scheduling information, the process passes back to block 179. Referring again to block 180, if a determination is made that the user has stopped the process of selecting a selection region associated with the scheduling information, the process passes to block 184 which depicts causing the displayed scheduling information to disappear. Thereafter, the process passes to block 174 as depicted through block 186.

Referring again to block 179, if a determination is made that one of the second plurality of selection regions has been selected, the process passes to block 181 which depicts the displaying of "display information" associated with the selected second selection region. For example, if the selected selection region is a scroll button, the "display information" may be additional scheduling information. "Display information" may also include further details regarding the associated scheduling information. Next, block 182 illustrates a determination of whether or not the user had stopped the process of selecting the second selection region. If a determination is made that the user has not stopped the process of selecting the second selection region, the process passes back to block 181. Referring again to block 182, if a determination is made that the user has stopped the process of selecting the second selection region, the process passes to block 183 which illustrates causing the "display information" to disappear. Thereafter, the process passes to block 180.

Referring again to block 174, if a determination is made that the user does not desire to view the scheduling information associated with a scheduled event, the process passes to block 192 as depicted through block 190. Block 192 depicts a determination of whether or not a user desires to view all of the scheduling information associated with a particular attendee. If a determination is made that the user does desire to view scheduling information associated with a particular attendee, the process passes to block 194 which depicts the selection of a selection region associated with the particular attendee. Next, block 196 depicts the determination and displaying of all of the scheduling information associated with the selection region. All scheduled events for the particular attendee for the displayed date will be displayed.

The process then passes to block 198 which illustrates the association of a second plurality of selection regions with the determined scheduling information. Next, block 200 depicts the association of "display information" with each of the second plurality of selection regions. The process then passes to block 202 which illustrates a determination of whether or not a user has selected one of the second plurality of selection regions. If a determination is made that one of the second plurality of selection regions has not been selected the process passes to block 204.

Block 204 depicts a determination of whether or not the user stopped the process of selecting the first selection region, associated with the scheduling information. If a determination is made that the user has not stopped the process of selecting the selection region associated with the scheduling information, the process passes back to block 202. Referring again to block 204, if a determination is made that the user has stopped the process of selecting a selection region associated with the scheduling information, the process passes to block 206 which depicts causing the displayed scheduling information to disappear. Thereafter, the process passes to block 174 as depicted through block 186.

Referring again to block 202, if a determination is made that one of the second plurality of selection regions has been selected, the process passes to block 208 which depicts the displaying of "display information" associated with the selected second selection region. For example, if the selected selection region is a scroll button, the "display information" may be additional scheduling information. Next, block 210 illustrates a determination of whether or not the user had stopped the process of selecting the second selection region. If a determination is made that the user has not stopped the process of selecting the second selection region, the process passes back to block 208. Referring again to block 210, if a determination is made that the user has stopped the process of selecting the second selection region, the process passes to block 212 which illustrates causing the "display information" to disappear. Thereafter, the process passes to block 204.

Referring again to block 192, if a determination is made that the user does not desire to view the scheduling information associated with an attendee, the process passes to block 214. Block 214 depicts a determination of whether or not a user desires to view all of the scheduling information associated with a user specified time block. If a determination is made that the user does not desire to view scheduling information associated a user specified time block, the process passes to block 174 as depicted through block 186.

Referring again to block 214, if a determination is made that the user does desire to view scheduling information associated a user specified time block, the process passes to block 216 which depicts the selection of a selection region including the specified time block by selecting the beginning time and ending time for the time block. Next, block 218 depicts the determination and displaying of all of the scheduling information associated with the selection region. All scheduled events within the user specified time block will be displayed.

The process then passes to block 220 which illustrates the association of a second plurality of selection regions with the determined scheduling information. Next, block 222 depicts the association of "display information" with each of the second plurality of selection regions. The process then passes to block 224 which illustrates a determination of whether or not a user has selected one of the second plurality of selection regions. If a determination is made that one of the second plurality of selection regions has not been selected the process passes to block 226.

Block 226 depicts a determination of whether or not the user stopped the process of selecting the first selection region, associated with the scheduling information. If a determination is made that the user has not stopped the process of selecting the selection region associated with the scheduling information, the process passes back to block 224. Referring again to block 226, if a determination is made that the user has stopped the process of selecting a selection region associated with the scheduling information, the process passes to block 228 which depicts causing the displayed scheduling information to disappear. Thereafter, the process passes to block 174 as depicted through block 186.

Referring again to block 224, if a determination is made that one of the second plurality of selection regions has been selected, the process passes to block 230 which depicts the displaying of "display information" associated with the selected second selection region. For example, if the selected selection region is a scroll button, the "display information" may be additional scheduling information. Next, block 232 illustrates a determination of whether or not the user had stopped the process of selecting the second selection region. If a determination is made that the user has not stopped the process of selecting the second selection region, the process passes back to block 230. Referring again to block 232, if a determination is made that the user has stopped the process of selecting the second selection region, the process passes to block 234 which illustrates causing the "display information" to disappear. Thereafter, the process passes to block 226.

While the invention has been particularly shown and described with reference to a preferred embodiment, it will be understood by those skilled in the art that various changes in form and detail may be made therein without departing from the spirit and scope of the invention.

We claim:

1. A method in a data processing system having a display for providing an intuitive display of scheduling information for a plurality of users within a single viewport, wherein each of said plurality of users has associated therewith a contiguous linear area along a time line displayed within said single viewport, wherein for each of said plurality of users a plurality of scheduled events are displayed within said area associated with said each of said plurality of users, said method comprising the steps of:

determining a plurality of selection regions within said viewport;

associating scheduling information with each of said plurality of selection regions, wherein said scheduling information includes at least one of said plurality of scheduled events;

permitting a user to select one of said plurality of selection regions; and while said user is selecting said one of said plurality of selection regions, temporarily displaying said scheduling information.

2. The method in a data processing system for providing an intuitive display of scheduling information for a plurality of users within a single viewport according to claim 1, wherein said selection region is associated with one of said plurality of scheduled events.

3. The method in a data processing system for providing an intuitive display of scheduling information for a plurality of users within a single viewport according to claim 1, wherein said selection region is associated with one of said plurality of users.

4. The method in a data processing system for providing an intuitive display of scheduling information for a plurality of users within a single viewport according to claim 1, wherein said selection region is associated with a user specified time block.

5. The method in a data processing system for providing an intuitive display of scheduling information for a plurality of users within a single viewport according to claim 1, further comprising the step of scrolling said scheduling information while said scheduling information is temporarily displayed.

6. The method in a data processing system for providing an intuitive display of scheduling information for a plurality of users within a single viewport according to claim 1, further comprising the step of moving said scheduling information within said single viewport while said scheduling information is temporarily displayed.

7. The method in a data processing system for providing an intuitive display of scheduling information for a plurality of users within a single viewport according to claim 1, wherein said scheduling information is temporarily displayed within a second viewport, and further comprising the steps of:

determining a second plurality of selection regions within said second viewport;

associating display information with each of said second plurality of selection regions;

permitting a user to select one of said second plurality of selection regions;

while said user is selecting said one of said second plurality of selection regions, temporarily displaying said display information.

8. The method in a data processing system for providing an intuitive display of scheduling information for a plurality of users within a single viewport according to claim 1, further comprising the steps of:

determining a plurality of scheduled time periods and a plurality of unscheduled time periods within a particular day for each of said plurality of users;

specifying a first period of time within said data processing system, wherein said first period of time is associated with at least one of a plurality of dates; and determining a second period of time included within said first period of time, wherein each of said plurality of users have an associated one of said plurality of unscheduled time periods during said second period of time.

9. The method in a data processing system for providing an intuitive display of scheduling information for a plurality of users within a single viewport according to claim 8, further comprising the steps of:

automatically displaying said plurality of scheduled time periods and said plurality of unscheduled time periods associated with each of said plurality of users within said at least one of said plurality of dates within a single viewport utilizing said display; and automatically designating said second period time within said viewport, wherein said second period of time represents an unscheduled time period for each of said plurality of users.

10. A data processing system having a display for providing an intuitive display of scheduling information for a plurality of users within a single viewport, wherein each of said plurality of users has associated therewith a contiguous linear area along a time line displayed within said single viewport, wherein for each of said plurality of users a plurality of scheduled events are displayed within said area associated with said each of said plurality of users, comprising:

means for determining a plurality of selection regions within said viewport;

means for associating scheduling information with each of said plurality of selection regions, wherein said scheduling information includes at least one of said plurality of scheduled events;

means for permitting a user to select one of said plurality of selection regions; and means for while said user is selecting said one of said plurality of selection regions, temporarily displaying said scheduling information.

11. The data processing system for providing an intuitive display of scheduling information for a plurality of users within a single viewport according to claim 10, wherein said selection region is associated with one of said plurality of scheduled events.

12. The data processing system for providing an intuitive display of scheduling information for a plurality of users within a single viewport according to claim 10, wherein said selection region is associated with one of said plurality of users.

13. The data processing system for providing an intuitive display of scheduling information for a plurality of users within a single viewport according to claim 10, wherein said selection region is associated with a user specified time block.

14. The data processing system for providing an intuitive display of scheduling information for a plurality of users within a single viewport according to claim 10, further comprising means for scrolling said scheduling information while said scheduling information is temporarily displayed.

15. The data processing system for providing an intuitive display of scheduling information for a plurality of users within a single viewport according to claim 10, further comprising means for moving said scheduling information within said single viewport while said scheduling information is temporarily displayed.

16. The data processing system for providing an intuitive display of scheduling information for a plurality of users within a single viewport according to claim 10, wherein said scheduling information is temporarily displayed within a second viewport, and further comprising:

means for determining a second plurality of selection regions within said second viewport;

means for associating display information with each of said second plurality of selection regions;

means for permitting a user to select one of said second plurality of selection regions; and means for while said user is selecting said one of said second plurality of selection regions, temporarily displaying said display information.

17. The data processing system for providing an intuitive display of scheduling information for a plurality of users within a single viewport according to claim 10, further comprising:

means for determining a plurality of scheduled time periods and a plurality of unscheduled time periods within a particular day for each of said plurality of user;

means for specifying a first period of time within said data processing system, wherein said first period of time is associated with at least one of a plurality of dates; and means for determining a second period of time included within said first period of time, wherein each of said plurality of users have an associated one of said plurality of unscheduled time periods during said second period of time.

18. The data processing system for providing an intuitive display of scheduling information for a plurality of users within a single viewport according to claim 17, further comprising:

means for automatically displaying said plurality of scheduled time periods and said plurality of unscheduled time periods associated with each of said plurality of users within said at least one of said plurality of dates within a single viewport utilizing said display; and means for automatically designating said second period time within said viewport, wherein said second period of time represents an unscheduled time period for each of said plurality of users.

* * * * *